(12) United States Patent
Sjöblom et al.

(10) Patent No.: US 11,927,492 B2
(45) Date of Patent: Mar. 12, 2024

(54) SENSOR AND A SYSTEM

(71) Applicant: Alleima Tube AB, Sandviken (SE)

(72) Inventors: Gustaf Sjöblom, Gävle (SE); Guoliang Wang, Solna (SE)

(73) Assignee: Alleima Tube AB, Sandviken (SE)

( * ) Notice: Subject to any disclaimer, the term of this patent is extended or adjusted under 35 U.S.C. 154(b) by 562 days.

(21) Appl. No.: 17/111,716

(22) Filed: Dec. 4, 2020

(65) Prior Publication Data
US 2021/0356330 A1 Nov. 18, 2021

(30) Foreign Application Priority Data

May 14, 2020 (EP) ..................................... 20174571

(51) Int. Cl.
*G01K 7/13* (2006.01)
*G01L 1/22* (2006.01)

(52) U.S. Cl.
CPC ............. *G01K 7/13* (2013.01); *G01L 1/2281* (2013.01)

(58) Field of Classification Search
CPC ................................... G01K 7/13; G01K 7/08
USPC ......................................................... 374/179
See application file for complete search history.

(56) References Cited

U.S. PATENT DOCUMENTS

2021/0310884 A1* 10/2021 Sjöblom ................. G01L 1/142

FOREIGN PATENT DOCUMENTS

CN 114705312 A * 7/2022

\* cited by examiner

*Primary Examiner* — Mirellys Jagan
(74) *Attorney, Agent, or Firm* — Morgan, Lewis & Bockius LLP

(57) ABSTRACT

A sensor includes a metal object and a thin film stack formed on at least a part of a surface of the metal object. The thin film stack has an electrically isolating film and a metallic film thereon. A first electrical conductor is defined in the metallic film and is electrically isolated from the metal object and has, in a first end, a connection point connected to a first terminal via a wire and, in a second end, a sensor structure defined in the metallic film. The sensor structure includes a junction of the metallic film penetrating the electrically isolating film to the metal object forming a thermocouple and a metal object terminal connected to a connection point of the metal object via a wire. The connection points of the first electrical conductor and of the metal object are adjacent to and in an isothermal relation with each other.

7 Claims, 3 Drawing Sheets

SENSOR AND A SYSTEM

TECHNICAL FIELD

Figure 1:
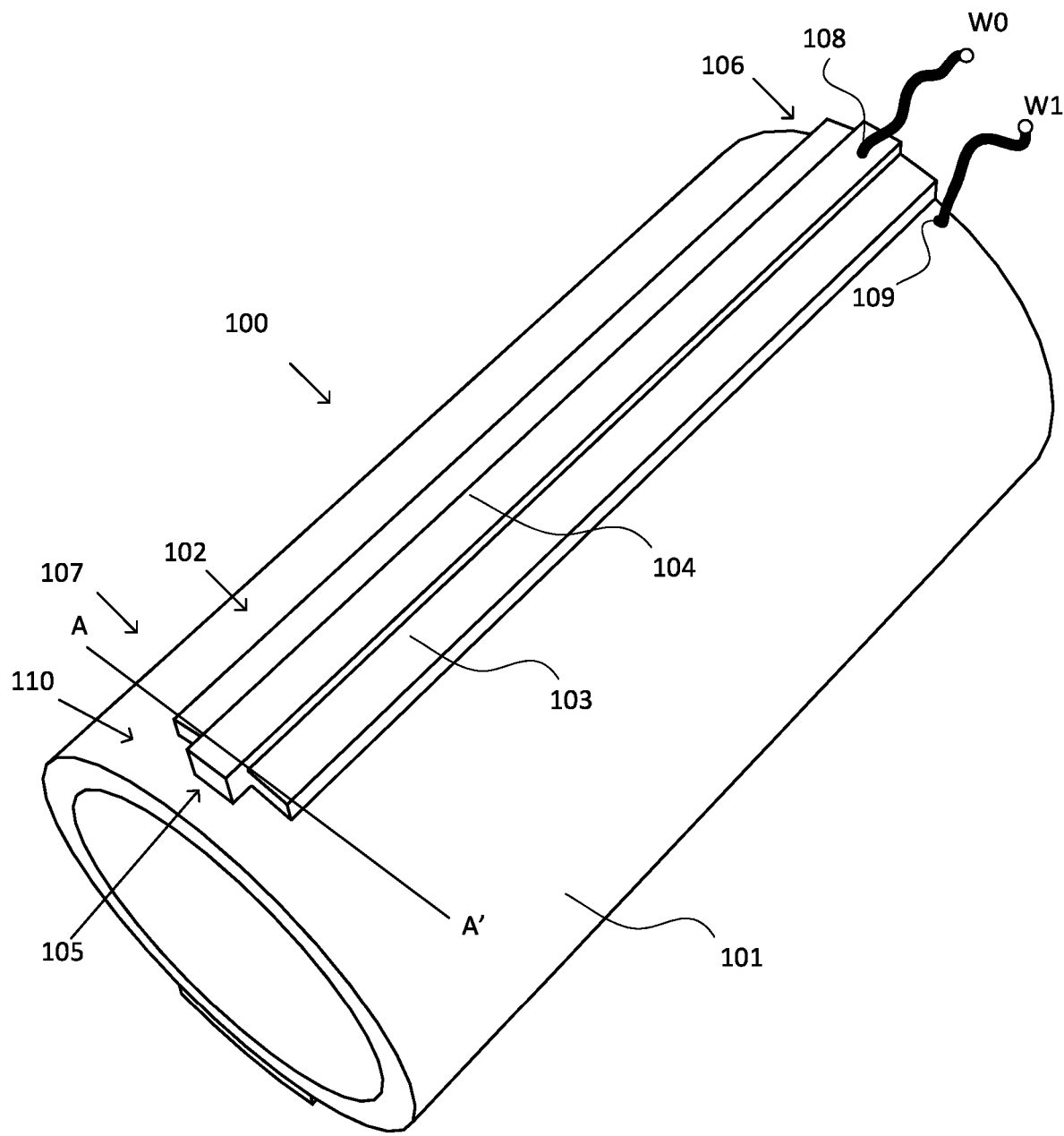

The present disclosure relates to the field of sensors, and more particularly to the field of thin film sensors on metal substrates.

BACKGROUND

Within the art of temperature measurements there are two main types of temperature sensors. The first type of temperature sensor is the resistance type in which the change of resistance of a material is related to the temperature by means of tabular data or a mathematical model. The second type of temperature sensor is the thermocouple, which involves sensing a small voltage generated in a junction between two dissimilar metals due to the Seebeck effect. This small voltage is then used together with tabular data or a mathematical equation to derive the measured temperature. A typical sensor of the first type is a PT-100 sensor, which is a platinum wire arranged on a ceramic substrate. An example of the second type is a thermocouple of Type K, which uses a welded junction between a chromel wire and an alumel wire as the temperature sensor to which a very precise voltmeter is connected, the measured voltage is then used to determine the sensed temperature using either tabular data or a mathematical model.

Both types of sensors use at least two wires for connection to signal conditioning electronics. This causes a large number of wires to route and connect, especially if several sensors are used.

In strain gauge measurements a bridge configuration is often used to mitigate the temperature effect on the strain gauge. In practice this solution uses a first strain gauge configured to sense the strain in a test object, a second strain gauge is arranged such that the second strain gauge experiences the same temperature as the first strain gauge but no strain. Thus, if the first and the second strain gauge are arranged in a first branch of the bridge the bridge becomes temperature compensated. If it is impossible to arrange the second strain gauge on the test object such that the second strain gauge is strain free, the strain as measured by the first strain gauge must be compensated by subtracting the strain caused by the thermal expansion of the sensor and the strain caused by the resistance change due to the temperature change. By a precise knowledge of the temperature of the strain gauge these strain contributions may be calculated and subtracted. Thus, it is of great importance to be able to precisely measure the temperature of the strain gauge and in practice this might be very difficult, since the strain gauge often is very small, and it is very difficult to arrange a temperature sensor close to the sensing wires of the strain gauge. It is therefore a great interest in a temperature sensor that is possible to integrate in a strain sensor.

It is therefore of great interest to reduce the number of wires used to connect the sensor.

There is also a great interest in a temperature sensor that is possible to integrate in a strain sensor with a reduced number of connecting wires. It is an aspect of the present disclosure to provide a solution which obviates or mitigates at least the above disclosed problem.

It is a further aspect of the present disclosure to provide an improved sensor.

SUMMARY

The present disclosure therefore provides a sensor which requires a smaller number of connecting wires. Additionally, the present disclosure also provides a sensor with a reduced number of connecting wires which may be integrated with a strain sensor.

The present disclosure therefore relates to a sensor, characterized in that it comprises: a metal object; a thin film stack formed on at least a part of a surface of the metal object, wherein the thin film stack comprises: an electrically isolating film; a metallic film on the electrically isolating film, wherein a first electrical conductor is defined in the metallic film, wherein the metallic film is composed of a different metal alloy than the metal object, wherein the first electrical conductor is electrically isolated from the metal object by means of the electrically isolated film, wherein the first electrical conductor comprises: in a first end a connection point connected to a first terminal via a wire; and in a second end a sensor structure defined in the metallic film, said sensor structure comprising: a junction of the metallic film penetrating the electrically isolating film to the metal object, whereby a thermocouple is formed; a metal object terminal connected to a connection point of the metal object via a wire, wherein the connection point of the first electrical conductor and the connection point of the metal object are configured to be adjacent to each other and in an isothermal relation with each other.

The sensor as defined hereinabove or hereinafter may further comprise: a second electrical conductor defined in the metallic film, wherein the second electrical conductor comprises a connection point in the first end, and in that the sensor area further comprises a strain sensitive part, between a first end and a second end, and which sensor area is configured to change resistance depending on an applied mechanical strain of the metallic object, wherein the first end of the strain sensitive part is connected to the first electrical conductor, and the second end of the strain sensitive part is connected to the second electrical conductor; and the junction point is configured to sense the temperature of the strain sensitive part.

The junction point of the sensor as defined hereinabove or hereinafter may be formed in the strain sensitive part.

The metallic object as discussed herein may be a metallic tube, or metallic strip.

The metal film as discussed herein may be selected a metal or a metal alloy for example but not limited to a nickel-chromium alloy.

With the phrase "the metallic film is composed of a different metal alloy than the metal object" is meant that the metals or metallic alloys which the metallic object or the metallic film is composed of must not have identical ranges of all alloying element contained therein as the alloys must differ in composition in order to synthesize a working thermocouple sensor.

According to the present invention, only one metallic material is needed to form thermocouple sensor. This is because the object as such is metallic and thereby only one additional metallic material is needed in order to form a thermocouple.

The electrically isolating film as discussed herein may be selected from a metal oxide or a metal nitride. This will allow the selection of an electrically isolating film with a similar heat capacity as the metal object, which will allow for minimum temperature difference between the surface of the metal object and the electrically isolating film.

The disclosure also relates to a sensor system for sensing strain and temperature of a metallic object, characterized in that it comprises: a sensor according to embodiments disclosed herein; a cold junction temperature detector configured for detecting the isothermal temperature of the connection points of the first electrical conductor and the metal object; a temperature circuit connected to the first terminal and to the metal object terminal and configured to measure the temperature of the junction, wherein the temperature circuit further is connected to the cold junction temperature detector for compensating for the cold junction temperature of the connection points; a strain circuit connected to the first terminal and to the second terminal for determining the strain based on the change of resistance of the strain sensitive part; and a calculation circuit connected to the temperature circuit and to the strain circuit, wherein the calculation circuit is configured to determine the strain caused by the mechanical strain on the metal object and the temperature induced strain of the metallic object.

LIST OF DRAWINGS

Figure 2:
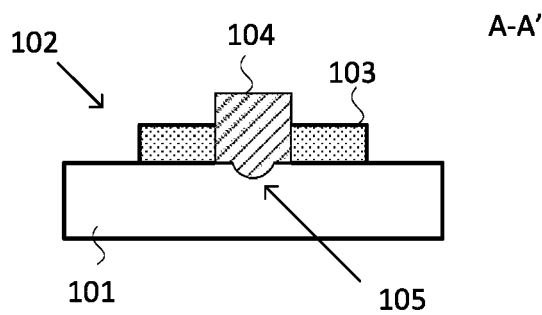
Figure 3:
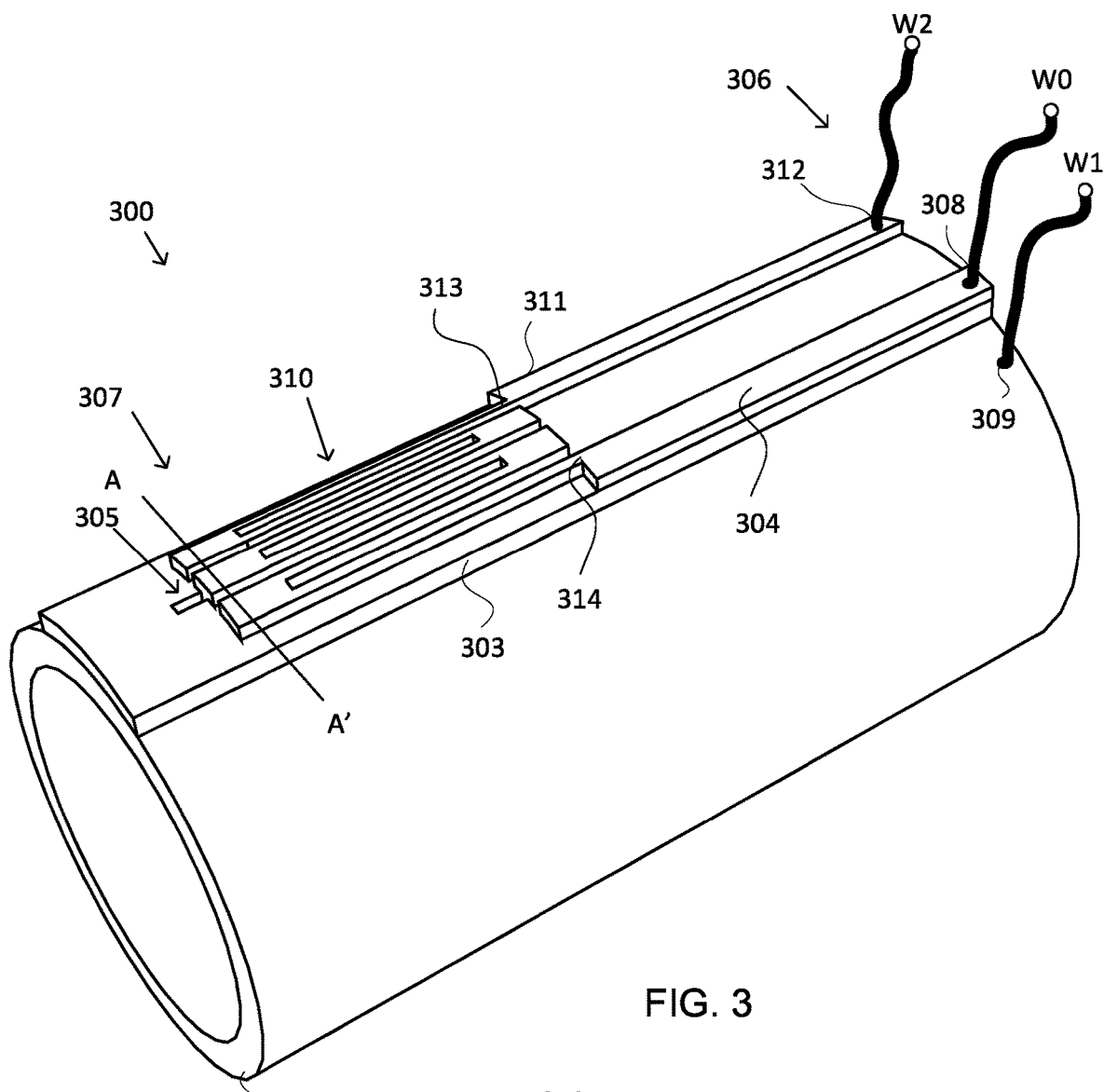
Figure 4:
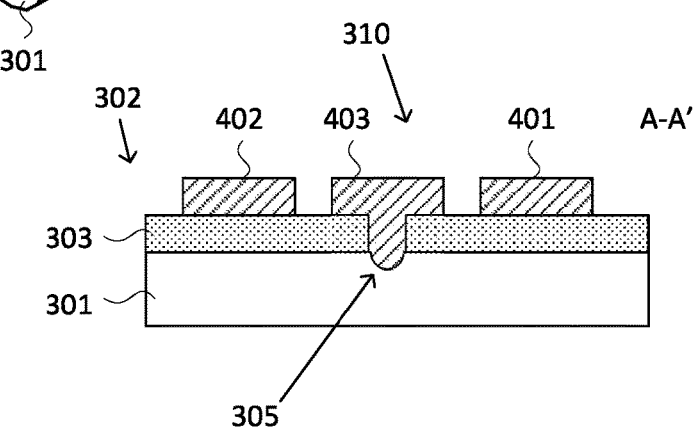
Figure 5:
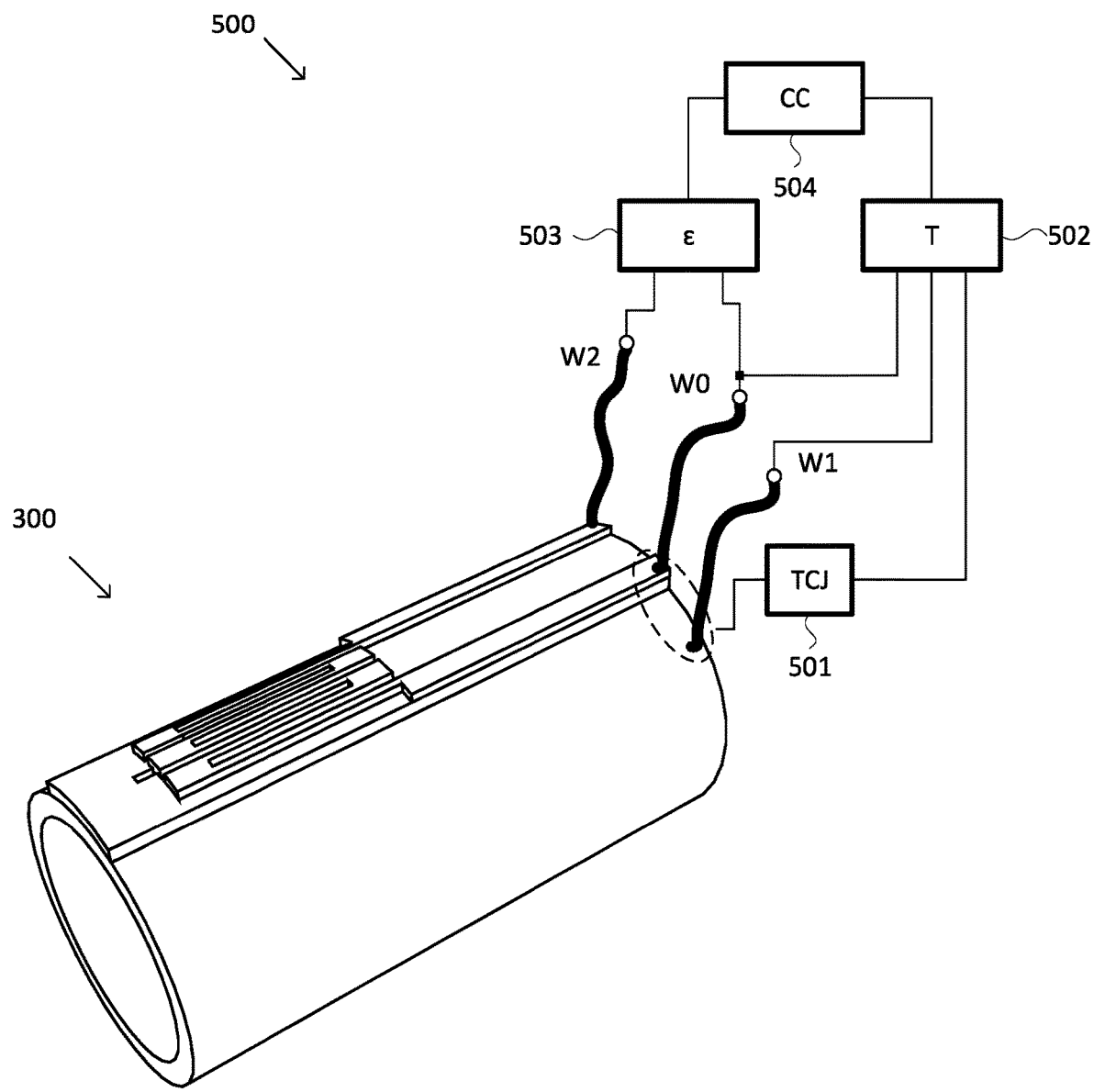

In the following, embodiment(s) according to this disclosure is/are described with reference made to the drawings on which:

FIG. 1 is a three-dimensional view of a sensor according to one embodiment of the present disclosure, FIG. 2 is cross-sectional view along the line A-A' of FIG. 1, which discloses a cross section of the sensor according to the embodiment disclosed in FIG. 1, FIG. 3 is a three-dimensional view of a sensor according to one embodiment of the present disclosure, FIG. 4 is cross-sectional view along the line A-A' of FIG. 3, which discloses a cross section of the sensor according to the embodiment disclosed in FIG. 3, and FIG. 5 is a schematic block diagram of a system according to one embodiment of the present disclosure.

DETAILED DESCRIPTION OF EMBODIMENTS

FIG. 1 shows a sensor, generally designated 100, which comprises: a metal object 101; a thin film stack 102 formed on at least a part of a surface of the metal object, wherein the thin film stack comprises: an electrically isolating film 103; a metallic film on the electrically isolating film, wherein a first electrical conductor 104 is defined in the metallic film, wherein the metallic film is composed of a different metal alloy than the metal object, wherein the first electrical conductor 104 is electrically isolated from the metal object 101 by means of the electrically isolated film 103, wherein the first electrical conductor 104 comprises: in a first end 106 a connection point 108 connected to a first terminal W0 via a wire; and in a second end 107 a sensor structure 110 defined in the metallic film, said sensor structure comprising: a junction 105 of the metallic film penetrating the electrically isolating film to the metal object, whereby a thermocouple is formed; a metal object terminal W1 connected to a connection point 109 of the metal object via a wire, wherein the connection point 108 of the first electrical conductor and the connection point 109 of the metal object are configured to be adjacent to each other and in an isothermal relation with each other. The junction 105 will be able to measure the process temperature inside the tube in a very accurate manner as the junction is close to the interior of the tube, thus the junction will only affected by a thermal gradient dictated by the thickness of the tube wall and will not affected by the thermal conductivity of an electrically isolating layer.

The connection point 108 of the first electrical conductor and the connection point 109 of the metal object has the same temperature due to their isothermal relation. This means that if the temperature of the connection points is measured a cold junction compensation may be performed by means of subtracting the temperature of the connection points from the measured temperature in order to calculate the temperature of the junction 105. In order to achieve an isothermal relation some isolation may be necessary in addition to arranging the connection points as close to each other as possible.

FIG. 2 discloses a cross sectional view along line A-A' in FIG. 1 of the sensor structure 110. The FIG. 2 shows the metal object 101 on which the thin film stack 102 is formed. The thin film stack comprises an electrically isolating film 103 which preferably is a metal oxide, or a metal nitride. On the electrically isolating film 103 is a metal film 104 formed and at a junction 105 the metal film penetrates the electrically isolating film and contacts the metal object. The metal film is could be of a nickel chromium alloy. Thus, a thermocouple is formed between the metal object and the metal film. The connectors to the thermocouple are formed by the first electrical connector and the metal object.

In FIG. 1 the metal object is a metal tube on which the thin film stack 102 is directly formed by means of for example thermal spraying, evaporation or sputtering. This means that the thin film stack will adhere to the metal object without the use of an adhesive. The surface of the metal object may have to be roughened in order to promote adherence of the thin film stack. This roughening may be performed by means of a sand blaster or grinding for example.

FIG. 3 discloses an embodiment of a sensor 300. The sensor comprises: a metal object 301; a thin film stack 302 formed on at least a part of a surface of the metal object, wherein the thin film stack comprises: an electrically isolating film 303; a metallic film on the electrically isolating film, wherein a first electrical conductor 304 is defined in the metallic film, wherein the metallic film is composed of a different metal alloy than the metal object, wherein the first electrical conductor is electrically isolated from the metal object by means of the electrically isolated film, wherein the first electrical conductor comprises: in a first end 306 a connection point 308 connected to a first terminal W0 via a wire; and in a second end 307 a sensor structure 310 defined in the metallic film, said sensor structure comprising: a junction 305 of the metallic film penetrating the electrically isolating film to the metal object, whereby a thermocouple is formed; a metal object terminal W1 connected to a connection point 309 of the metal object via a wire, wherein the connection point 308 of the first electrical conductor and the connection point 309 of the metal object are configured to be adjacent to each other and in an isothermal relation with each other.

The sensor 300 disclosed in FIG. 3 differs from the embodiment disclosed with reference made to FIG. 1 in that it also comprises: a second electrical conductor 311 defined in the metallic film, wherein the second electrical conductor comprises a connection point 312 in the first end 306; and in that the sensor area 310 further comprises a strain sensitive part, between a first end 314 and a second end 313, and which sensor area 310 is configured to change resistance depending on an applied mechanical strain of the metallic object 301, wherein the first end 314 of the strain sensitive part is connected to the first electrical conductor 304, and the second end 313 of the strain sensitive part is connected to the second electrical conductor 311; and the junction point 305 is configured to sense the temperature of the strain sensitive part.

FIG. 4 discloses a cross sectional view along line A-A' in FIG. 3 of the sensor structure 310. The cross sectional view of FIG. 4 shows the sensor structure 310, which comprises a first strain sensitive conductor 401 defined in the metal film. The first strain sensitive conductor 401 is connected to the first end 314. The sensor structure 310 further comprises a second strain sensitive conductor 402 connected to the second end 313. The sensor structure further comprises a third strain sensitive conductor 403 connected to the first and second strain sensitive conductor 401,402. The third strain sensitive conductor 403 is also defined by the metal film and penetrates the electrically isolating film in a junction 305 between the metal film and the metal object. This junction 305 may be formed by laser etching. The junction point 305 is thus formed in the strain sensitive part.

The metallic object is a metallic tube, or metallic strip.

The metal film may be selected from a nickel-chromium alloy.

The electrically isolating film may be selected from a metal oxide or a metal nitride.

FIG. 5 discloses a sensor system, generally designated 500, for sensing strain and temperature of a metallic object. The sensor system comprises a sensor 300 according to embodiments disclosed herein above, a cold junction temperature detector 501 configured for detecting the isothermal temperature of the connection points 308,309 of the first electrical conductor and the metal object. The sensor system further comprises a temperature circuit 502 connected to the first terminal W0 and to the metal object terminal W1 and configured to measure the temperature of the junction. The temperature circuit is further connected to the cold junction temperature detector for compensating for the cold junction temperature of the connection points 308,309. The sensor system further comprises a strain circuit 503 connected to the first terminal W0 and to the second terminal W2 for determining the strain based on the change of resistance of the strain sensitive part, and a calculation circuit 504 connected to the temperature circuit 502 and to the strain circuit 503. The calculation circuit is configured to determine the strain caused by the mechanical strain on the metal object and the temperature induced strain of the metallic object.

The invention claimed is:

1. A sensor, comprising:
a metal object; and
a thin film stack formed on at least a part of a surface of the metal object, wherein the thin film stack comprises:
an electrically isolating film;
a metallic film on the electrically isolating film, wherein a first electrical conductor is defined in the metallic film, wherein the metallic film is composed of a different metal alloy than the metal object, wherein the first electrical conductor is electrically isolated from the metal object by means of the electrically isolated film, and wherein the first electrical conductor comprises:
in a first end of the first electrical conductor, a first connection point connected to a first terminal via a first wire; and
in a second end of the first electrical conductor, a sensor structure defined in the metallic film, said sensor structure comprising a junction of the metallic film penetrating the electrically isolating film to the metal object, whereby a thermocouple is formed;
wherein a metal object terminal is connected to a connection point of the metal object via a second wire, and
wherein the first connection point of the first electrical conductor and the connection point of the metal object are configured to be adjacent to each other and in an isothermal relation with each other.

2. The sensor according to claim 1, wherein the metal object is a metallic tube or a metallic strip.

3. The sensor according to claim 1, wherein the electrically isolating film is a metal oxide or a metal nitride.

4. The sensor according to claim 1, further comprising:
a second electrical conductor defined in the metallic film, wherein the second electrical conductor comprises a second connection point in a first end of the second electrical conductor, and
a sensor area including the sensor structure and a strain sensitive part, wherein a first end of the strain sensitive part is connected to the first electrical conductor and a second end of the strain sensitive part is connected to the second electrical conductor, and wherein the strain sensitive part is configured to change resistance depending on an applied mechanical strain of the metal object, wherein the first end of the strain sensitive part is connected to the first electrical conductor, and
wherein the junction is configured to sense a temperature of the strain sensitive part.

5. The sensor according to claim 4, wherein the junction is formed in the strain sensitive part.

6. A sensor system for sensing strain and temperature of a metallic object, comprising:
a sensor according to claim 2;
a cold junction temperature detector configured for detecting an isothermal temperature of the first connection point of the first electrical conductor and the connection point of the metal object and the metal object;
a temperature circuit connected to the first terminal and to the metal object terminal and configured to measure a temperature of the cold junction, wherein the temperature circuit is further connected to the cold junction temperature detector for compensating for a cold junction temperature of the first connection point of the first electrical conductor and the connection point of the metal object;
a strain circuit connected to the first terminal and to a second terminal for determining a strain based on a change of resistance of the strain sensitive part, wherein the second terminal is connected to the second connection point via a third wire; and
a calculation circuit connected to the temperature circuit and to the strain circuit, wherein the calculation circuit is configured to determine a strain caused by the applied mechanical strain on the metal object and a temperature induced strain of the metal object.

7. The sensor system according to claim 6, wherein the junction is formed in the strain sensitive part.

* * * * *